United States Patent
Kendall et al.

(10) Patent No.: US 8,315,891 B2
(45) Date of Patent: *Nov. 20, 2012

(54) SYSTEM FOR SEARCHING AND SOLVING FOR INSURANCE PRODUCTS

(75) Inventors: Errol O. Kendall, Atlanta, GA (US); Elizabeth A. Braswell, Alpharetta, GA (US); Samuel H. Turner, Richmond, VA (US); Keith J. Maurer, Tampa, FL (US)

(73) Assignee: Efficient Markets Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/233,439

(22) Filed: Sep. 15, 2011

(65) Prior Publication Data

US 2012/0066009 A1    Mar. 15, 2012

Related U.S. Application Data (63) Continuation of application No. 10/935,754, filed on Sep. 8, 2004, now Pat. No. 8,024,203.

(51) Int. Cl.
   *G06Q 40/00* (2012.01)
(52) U.S. Cl. .......................................................... 705/4
(58) Field of Classification Search ........................ 705/4
   See application file for complete search history.

(56) References Cited

U.S. PATENT DOCUMENTS

| | | | |
|---|---|---|---|
| 5,291,398 A | 3/1994 | Hagan | |
| 5,375,055 A | 12/1994 | Togher et al. | |
| 5,655,085 A * | 8/1997 | Ryan et al. | 705/4 |
| 5,704,045 A | 12/1997 | King et al. | |
| 5,758,328 A | 5/1998 | Giovannoli | |
| 5,839,118 A * | 11/1998 | Ryan et al. | 705/36 R |
| 5,966,693 A * | 10/1999 | Burgess | 705/4 |
| 5,987,434 A * | 11/1999 | Libman | 705/36 R |
| 5,991,744 A * | 11/1999 | DiCresce | 705/36 R |
| 6,119,093 A | 9/2000 | Walker et al. | |
| 6,233,566 B1 | 5/2001 | Levine et al. | |
| 6,322,129 B2 | 11/2001 | Huotari | |
| 6,456,979 B1 * | 9/2002 | Flagg | 705/4 |

(Continued)

FOREIGN PATENT DOCUMENTS

KR    2000-0050079    8/2000

(Continued)

OTHER PUBLICATIONS

Easley et al.: Risk based Pricing of Life Insurance Products, Nationwide Life Inrance Company, Columbus Ohio, 2nd AFIR Colliquium 1991, 3 pp. 199-217.*

(Continued)

*Primary Examiner* — Bijendra K Shrestha
(74) *Attorney, Agent, or Firm* — McKenna Long & Aldridge LLP (57) ABSTRACT

A system for evaluating and scoring software products in which illustration engines relating to insurance products are run based on a common set of inputs. The illustration engines output a set of output metrics which are common to all illustration engines. The output metrics of products selected for comparison or evaluation are mathematically combined with each other and with the corresponding metrics of from all other illustration engines to determine a score which can be used to compare quickly and accurately the selected product against all other products in the database. The score may be determined by a weighted average in which the weights assigned to output metrics are adjustable at the user's discretion.

7 Claims, 4 Drawing Sheets

U.S. PATENT DOCUMENTS

| | | | |
|---|---|---|---|
| 6,684,189 B1* | 1/2004 | Ryan et al. .................... 705/4 |
| 7,698,158 B1 | 4/2010 | Flagg | |
| 2001/0023404 A1 | 9/2001 | Ogawa et al. | |
| 2002/0007332 A1* | 1/2002 | Johnson et al. ............. 705/36 |
| 2002/0091613 A1* | 7/2002 | Kendall et al. .............. 705/37 |
| 2003/0191672 A1 | 10/2003 | Kendall et al. | |
| 2005/0027572 A1 | 2/2005 | Goshert | |

FOREIGN PATENT DOCUMENTS

| | | |
|---|---|---|
| WO | WO 91/20071 | 12/1991 |
| WO | WO 02/29650 | 4/2002 |

OTHER PUBLICATIONS

D'Arcy et al.: A Comparison of Property/Casualty Insurance Financial Pricing Models, May 1998, pp. 1-88.*

Stuenkel, S: Relationship of IRR to ROI on a Level Term Insurance Policy, Aug. 2002, Product Matters!, Issue No. 53, pp. 14-17.*

Bragg Associates, Inc., Actuarial Conselling Report, 1995, pp. 1-10.

Bragg Associates, Inc., About the Bragg Index Methodology, 1995, pp. 1-3.

Bragg Associates, Inc. Bragg Index, May 10, 1995, vol. 1, pp. 1-2.

Physician's Money Digest, Don't Get Ripped Off When Buying Life Insurance, Feb. 1996, pp. 29-30.

Martin Weiss' Safe Money Report, A new collapse in long-term bonds will make 1994 look like a picnic. Wait for yeilds of 9% of better before buying, Jun. 14, 1995, Issue #254, pp. 1-13.

Consumer Reports, Time to Think About Life Insurance, Jul. 1993, pp. 431-603.

The Bragg Index and Statusquote, Differentiating KeyCorp's Life Insurance Business, Atlanta, Georgia, Feb. 17, 1997, pp. 1-13.

National Underwriter, The Life Industry Needs a Product-Rating System, Apr. 17, 1996, pp. 11.

National Underwriter, Black Box Alien's Been Sighted on Annuity Block, Jul. 15, 2996, pp. 16.

National Underwriter, Product Ratings May Be Closer Than You Think, Oct. 268, 1996, pp. 23.

"Rate of Return on Differential Premiums for Selected Participating Life Insurance Contracts" by Phyllis Schiller Myers and S. Travis Pritchett. The Journal of Risk and Insurance, vol. 50, No. 4 (Dec. 1983), pp. 569-586.

"The Rate of Return on Universal Life Insurance" by Antony C. Cherin and Robert C. Hutchins. The Journal of Risk and Insurance, vol. 54, No. 4. (Dec. 1987), pp. 691-711.

"Life Insurance Management Issues" by Stephen W. Forbes. The Journal of Risk and Insurance, vol. 54, No. 3 (Sep. 1987), pp. 603-613.

"Determinants of Universal Life Insurance Cash Values" by James M. Carson. The Journal of Risk and Insurance, vol. 63, No. 4, Symposium on Catasrophic Risk. (Dec. 1996), pp. 673-681.

"Effects of Relationship Marketing on Satisfaction, Retention, and Prices in the Life Insurance Industry" by Lawrence A. Crosby and Nancy Stephens. Journal of Marketing Research, vol. 24, No. 4 (Nov. 1987).

"Classifying Financial Distress in the Life Insurance Industry," by Ran BarNiv and Robert A. Hershbarger. The Journal of Risk and Insurance, vol. 57, No. 1 (Mar. 1990), pp. 110-136.

Consumer Reports, Glasses; Life Insurance: Did Your Agent Lie to You?; Aug. 1993, pp. 525-539.

Consumer Reports, Survival Guide to Supermarkets; Sep. 1993; pp. 555,595-603.

Easley et al.; "Risk based Pricing of Life Insurance Products, Nationwide Life Insurance Company", Columbus Ohio, $2^{nd}$ AFIR Colliquium 1991, 3 pp. 199-217.

Lohmann et al.; The IRR, NPV, and payback period and their relative performance in common capital budgeting decision procedures for dealing with risk, The Engineeering Economist, Fall 1994, vol. 39, Issue 1, p. 17.

Fairley et al.; Investment Analysis using probability distribution of the Internal Rate of Return, Aug. 1975, Management Science, vol. 21, No. 12, pp. 1428-1437.

* cited by examiner

SYSTEM FOR SEARCHING AND SOLVING FOR INSURANCE PRODUCTS

This application is a continuation application of U.S. patent application Ser. No. 10/935,754, filed Sep. 8, 2004 Now U.S. Pat. No. 8,024,203, which is hereby incorporated by reference as if fully set forth herein.

BACKGROUND OF THE INVENTION

1. Field of the Invention

The present invention relates to evaluating insurance products. More specifically, the system relates to using software and computer systems to evaluate a group of insurance products based on a common derived set of output metrics.

2. Discussion of the Related Art

The financial services industry consists of industry segments such as insurance and banking. In turn, the insurance industry consists of industry segments such as life insurance, health insurance, and property and casualty insurance.

The life insurance industry includes product markets such as term life insurance, universal life insurance, variable life insurance, annuities, joint products, viatical settlements, preneed insurance, and long-term care insurance. Insurance carriers sell life insurance products through various distribution channels such as captive agents, independent agents, banks, affinity groups, and financial planners.

The present life insurance product markets for both insurance product proposals and in-force insurance products are inefficient. For insurance product proposals, the problem stems from: (1) an inadequate exchange of information between consumers and insurers during the selling process and, (2) the absence of a real-time auction market in which to price life insurance product proposals. Inefficient product markets for in-force insurance products stem from the absence of a system for measuring an insurance product's performance while that product is in-force.

An inadequate exchange of relevant and available information between consumers and insurers during the selling process is a significant source of product market inefficiency. Typically, consumers often do not receive relevant and available information necessary to make an informed purchase decision. Also, insurers frequently do not receive relevant and available information on the consumer and current market pricing necessary to tailor their proposals for optimal product performance and pricing. Such inefficient transmission of information results in product market inefficiency. Such product market inefficiency in the insurance industry adversely affects consumers and insurance companies.

Moreover, many life insurance products have complex features that consumers do not understand. Consumers' lack of insurance product knowledge opens the door to misleading sales practices such as twisting, churning, and vanishing premiums. Product "gimmickry," such as lapse basing, preys on a consumer's inability to detect its existence. Recent, widely publicized accounts of race-based underwriting indicate that market conduct problems can go undetected for years by consumers, insurance company managements, and insurance industry regulators. Insurance industry regulators have attempted to enforce market conduct standards. Insurance companies have sought to curtail sales abuses. Their efforts have not solved the problem.

Market conduct problems occur regardless of an insurance company's financial strength. Favorable financial ratings are no indication of an insurer's compliance with market conduct standards. Independent rating firms evaluate an insurer's claims paying ability. They do not rate the products sold by insurers. The life insurance industry has no product rating system that appraises a proposed insurance product's total value to the consumer.

These and other market conduct problems point to the need for a system that assists the consumer in appraising a proposed insurance product's value.

The life insurance industry is fragmented. Over a thousand insurers populate the industry, and product commoditization prevails. Product commoditization is common in fragmented industries, brings about price competition, and shrinks margins. Life insurers yearn for product differentiation.

Many insurers have high financial and counterparty credit strength ratings that are assigned by rating agencies such as Standard & Poor's, A.M. Best, Moody's and Fitch. But a high rating is no source of product differentiation. It is a prerequisite for selling insurance through certain distribution channels such as wirehouses, independent broker-dealers, and banks. Rating agencies intend for a financial strength rating to serve as a measure of an insurer's claims paying ability. Counterparty credit ratings gauge the creditworthiness of an insurer's debt securities.

The ubiquity of financial strength ratings underscores a struggle insurers face in their search for product differentiation. Rating agencies do not rate life insurance and annuity products.

For intermediaries and consumers, life insurance can be a complex and frequently confusing product. Intermediaries struggle with analyzing and comparing insurers' products and achieving credibility in their recommendations. Sound policy purchase or retention recommendations require informed evaluations of both policy value and the insurer's financial strength. Making unsupported recommendations is risky, and product complexity can make evaluating and recommending a policy difficult and subjective.

Consumers usually have no way of objectively knowing whether a policy proposal is better, worse, or about the same as other policies available in the marketplace. This can result in decisions based on no information, bad information, or even irrelevant information, such as relying on the perceived quality or the financial strength rating of the insurer offering the policy.

No system exists for embedding real-time, objective product value comparisons into the life insurance selling process. Similarly, no system for rating the value of an existing policy's expected future performance is available in the marketplace. The life insurance industry has been stuck with an inefficient way of doing business that gives up margin to product commoditization and where product complexity gets in the way of closing sales.

For these reasons, the challenges facing life insurance companies and intermediaries in selling life insurance point to an unmet need for independent life and annuity product ratings. Efficient Markets was founded to fill this unmet need.

Likewise, other financial products, including mortgages and other complex loans, for example, have costs, fees, expenses, and tax considerations beyond principal and interest rate, that vary greatly among borrowers and lenders, and are similarly difficult to evaluate precisely and objectively.

SUMMARY OF THE INVENTION

Accordingly, the present invention is directed to searching and searching and solving for the highest scoring insurance products that substantially obviates one or more of the problems due to limitations and disadvantages of the related art.

An advantage of the present invention is to provide a system and method for evaluating insurance products that is based on precise information about the user rather than generalizations or approximations.

Another advantage of the present invention is to provide a score for comparing insurance products in which the score is based on the precise information about the user and the financial information about the policy as it relates to that user.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for evaluating insurance products is provided that includes storing at least one illustration engine in a database corresponding to an insurance product; selecting a group of products for evaluation; determining a set of input fields based on the required inputs of each of the illustration engines corresponding to each selected product; obtaining input data for each of said input fields through a user interface; running at least those illustration engines that correspond to the selected products to obtain a plurality of output metrics and their corresponding values for each of said products; and scoring said products based on a predetermined scoring algorithm. At least one of the output metrics is a common output metric obtained for each illustration engine. In addition the algorithm scores said products based at least upon said common output metric.

In another aspect of the present invention, a system for scoring and evaluating insurance products includes a database or illustration engine bank; a plurality of illustration engines stored in said database, each of said illustration engines corresponding to an insurance product; a set of inputs common to a plurality of illustration engines in said database, each of said illustration engines determining a set of output metrics based on said inputs, said set of output metrics being common to all illustration engines; and a product score for a product based on a weighted average determined by relating at least one output metric to the value of the corresponding output metric determined by another illustration engine.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A-3B illustrate sample output reports according to an aspect of an embodiment of the present invention.

DETAILED DESCRIPTION OF THE ILLUSTRATED EMBODIMENTS

Reference will now be made in detail to embodiments of the present invention, example of which is illustrated in the accompanying drawings.

The present invention is suitable for evaluating any type of financial product, including but not limited to annuities, life, accident, long-term care, disability, health, property and casualty, liability, and malpractice insurance; mortgages, certificates of deposit, derivatives, or any financial product generally that may be reduced, represented by, or modeled as a series of cash flows. The examples and embodiment discussed herein relate to insurance products, but it is understood that the system and method of the present invention may be applied to other financial products as well.

Figure 1:
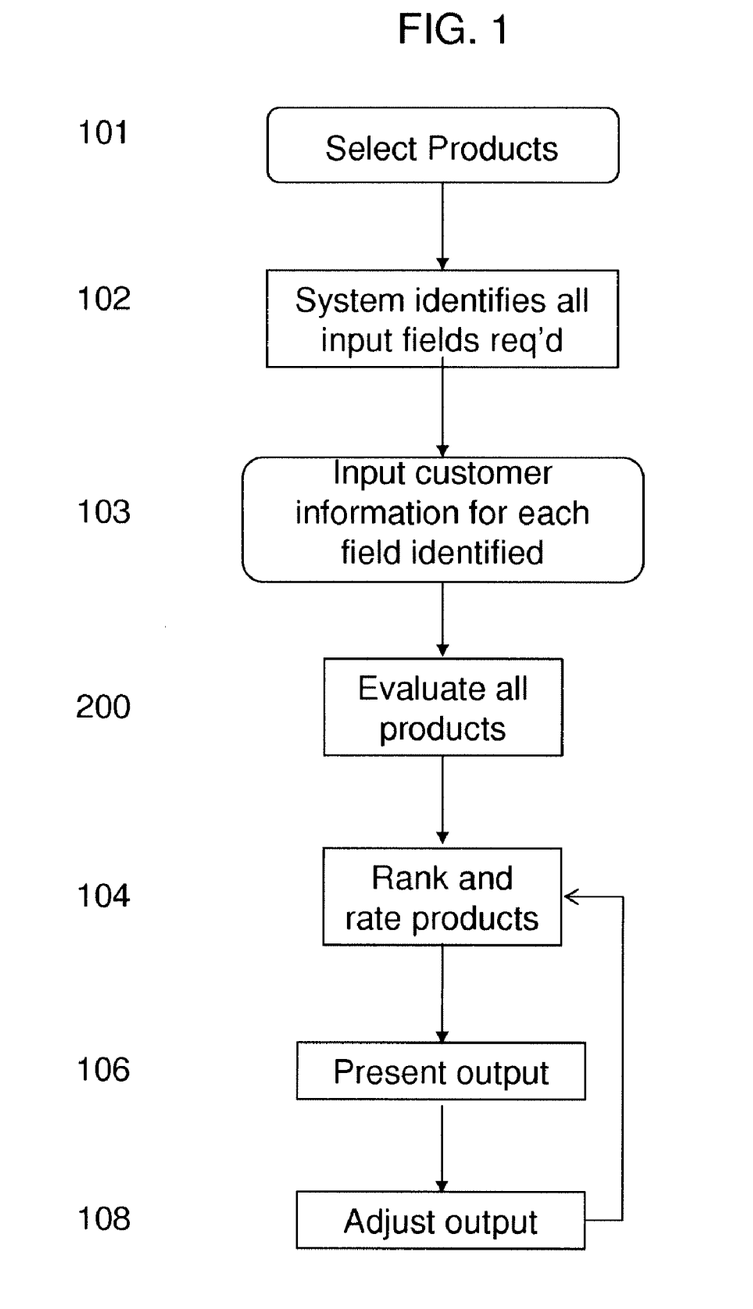
FIG. 1 is a flow chart illustrating the operation of the evaluation system according to an embodiment of the present invention.

FIG. 1 illustrates flow diagram according to an exemplary embodiment of the present invention in which insurance products are being evaluated. In this exemplary embodiment, the system is provided with a series, database, or bank of insurance product illustration engines, a means for accepting information about a customer scenario, a means for accepting information about products to display on a report, means for processing the scenario and output from the illustration engines, and a means for displaying a report. It is understood that such means may include computers and computer networks, for example, including but not limited to desktop computers, handheld computing devices, client-server networks, mainframes, or the like. The illustration engines are software that processes the policy scenario against the details of a particular product to yield a series of cash values for each year. In an aspect of this invention, the illustration engines illustrate insurance products from a wide variety of carriers. The bank may include illustration engines for all or nearly all of the products on the market, or for all of a single particular type of insurance product, or for products from a single carrier.

The output of the illustration engines is a series of values (for example, premium, death benefit, and total cash surrender value) for each year, for each product. In another aspect of the invention, decrements may be applied to these cash values to obtain a series of cash flows. The decrements, which may be derived from mortality or lapse tables, or both, represent the probability of death, probability of lapse, and probability of persistence (that the customer will stay with the policy and not die or lapse). Applying one or more of these the decrements to the values for each of the products that are output by the illustration engines results in a series of cash flows for each product, the elements of the cash flow being death benefit, premium, and cash value.

An aspect of this embodiment of the present invention is illustrated in FIG. 1. In step 101, information about the products to be reported on is input into the evaluation system. In an aspect of this embodiment, the user may be presented with options to select all of the products from a particular carrier. In another aspect of this embodiment, the universe of products from which the user selects may be limited based on a user's access level, those products which they are licensed to sell, or based on a contractual obligation.

Based on the products selected for evaluation, the system identifies all of the input fields for the customer and policy scenario. This includes information that may be required for all products, such as age and sex, as well as financial circumstances. For example, part of the customer information may include information about loans or withdrawals from the policy. At step 102, the system identifies all of the input fields needed for all of the selected products and presents them for the user's input at one time. This way, the user is not asked to input any information more than once, and nor is the user required to input information that is unnecessary.

The user enters all of the information about the customer at step 103, and starts the searching and solving process. Each product is scored by running information from the customer scenario through the illustration engine at step 200, taking that output to obtain a series of cash flows for each product which are then used in step 104 to rank and rate the products. This scoring process will be discussed in greater detail with reference to FIGS. 2 and 3.

After the evaluation 200 and ranking 104 of all of the products is complete, the system presents the results in a user-friendly format at step 106. This format may include charts, graphs, diagrams or a printed report, such as the exemplary reports illustrated in FIGS. 3A and 3B, or interactive screens and spreadsheets which can be further manipulated. Once the information is presented, the system may allow the user to re-score the products at step 108 by adjusting the weightings of the output scoring components or by discounting some components altogether, based on user or customer preference.

From the diagram of FIG. 1, it is understood that the system must have access to the details of each of the products as well as a predetermined set of outputs in order to perform the product evaluation and scoring. These details are discussed in greater detail in FIG. 2.

Figure 2:
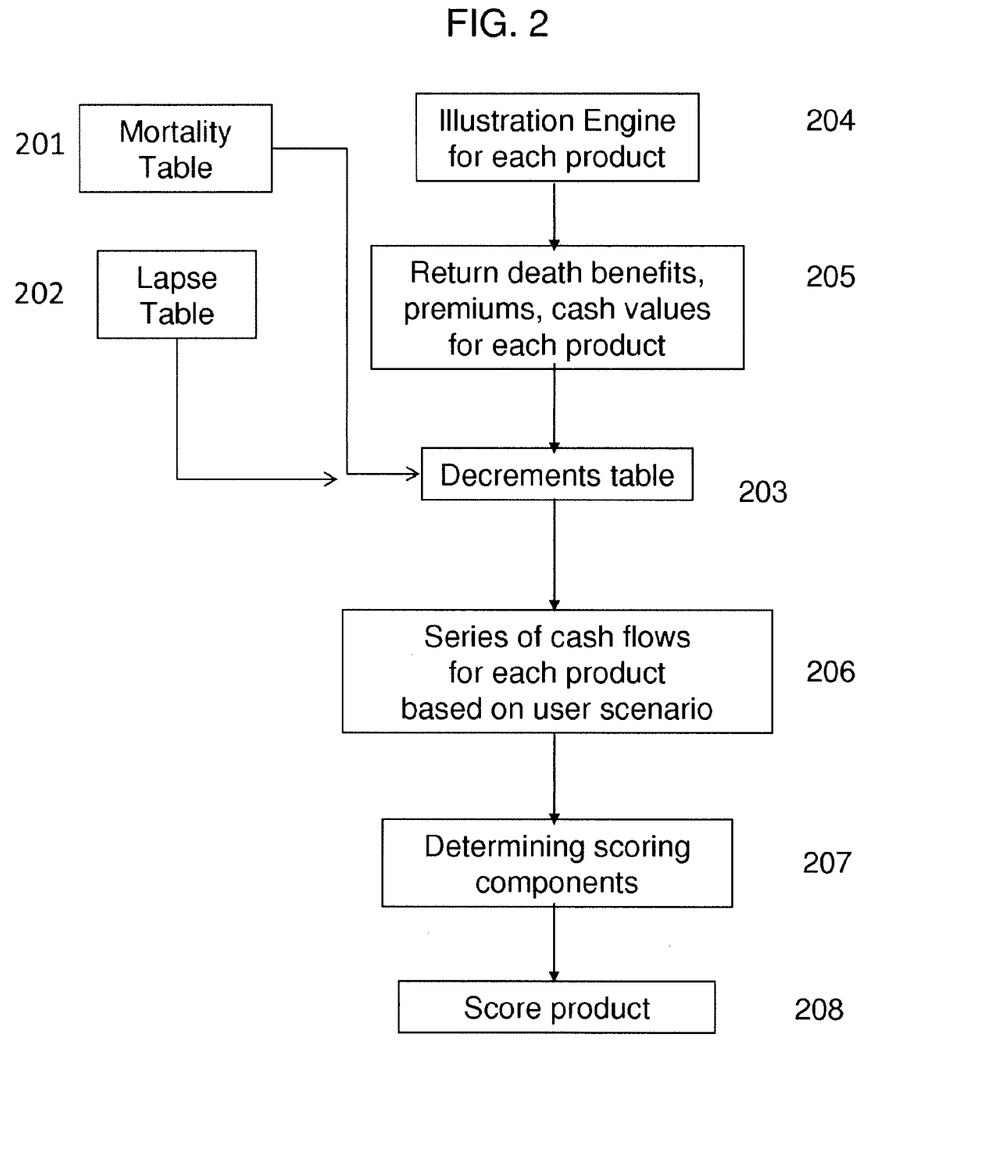
FIG. 2 is a flow chart illustrating the operation of the illustration engines in an aspect of an embodiment of the present invention.
Figure 3B:
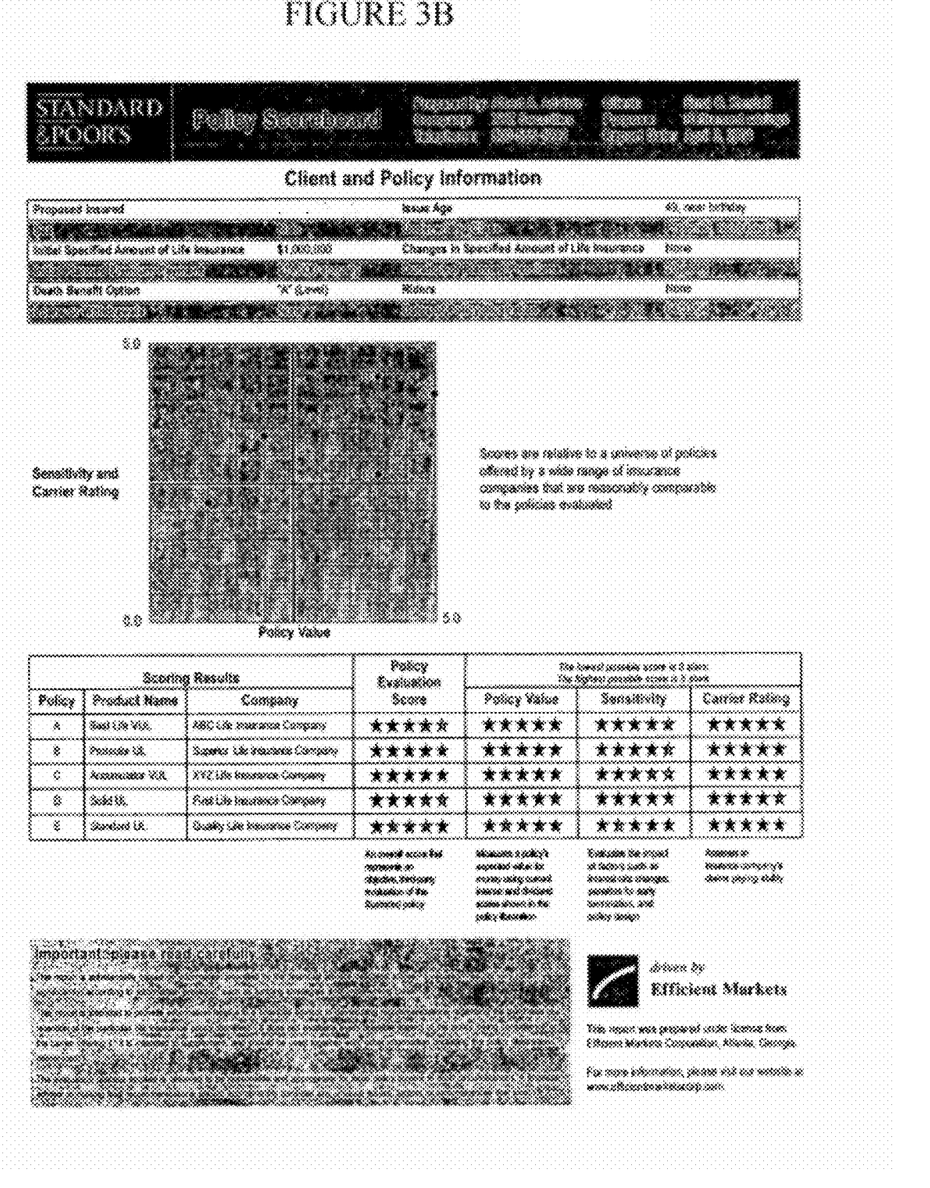

FIG. 2 illustrates the evaluation process step 200 of FIG. 1 in more detail. Whereas related art insurance comparison schemes rely on static product data to compare products, stored as insurance tables or static fields in a database, the present invention is able to provide a more accurate comparison and evaluation by relying on an illustration engine for each product. Each illustration engine is an algorithm or software program that operates on the input data according to the features of the policy. Thus, the illustration engines are not limited to user input in the form of to stored data tables that only approximate a customer's demographic information.

Furthermore, the illustration engines, and the algorithms and software that drive them, return a set of data including premium, death benefit, and cash value. To compare the products to each other, the illustration engines must output the same data, or at least a common set of data. In practice it is convenient to select as the output for the illustration engine the cash value, death benefit, and premium information. For other types of financial products, the illustration engine output may use some industry standard data. The illustration engines themselves may be provided to the system by the insurance company itself or a third party.

The operation of the illustration engines is discussed herein in detail. To evaluate the products, the system of the present invention in the embodiment under discussion and as illustrated in FIG. 2 has a database of these illustration engines. Once the user enters all of the required input information, the system runs the illustration engines at step 200 as noted earlier.

FIG. 2 illustrates the process to evaluate the products using the illustration engines according to an aspect of a first exemplary embodiment of the present invention. In this particular aspect of this exemplary embodiment, mortality table 201 and lapse table 202 are used to compile a decrements table 203 that represents the probability of death, probability of lapse, and probability of persistence (that the customer will stay with the policy and not die or lapse).

Before, after, or in parallel to the creation of the decrements table, the illustration engine for each product is run at step 204 based on the user information supplied in step 103 in FIG. 1.

In one aspect of this embodiment of the invention, the system runs only those illustration engines that were selected for comparison. In another aspect, the system runs all of the engines in the database, but returns scores only for those selected. In a further aspect, the system runs all of the engines in the database, scores all of the policies, but only reports on a small subset of those policies. Furthermore, the system of the present invention may run each illustration engine in turn, in a sequential or serial process, or it may run two or more, or all, or the illustration engines at once in a parallel process.

As noted earlier, the illustration engines perform operations and calculations on the customer scenario input data at step 204 to return the set of death benefits, premiums, and cash values for each year for each policy, to which are applied the decrements in order to obtain a series of cash flows at step 205. Then the decrements from step 203 are applied to the illustration engine output from step 205 to produce a series of cash flows at step 206.

In addition, for different financial products there may be other factors that are applied to the output of the illustration engines other than the insurance related decrements derived from mortality and lapse tables. For example, in the case of a mortgage policy, while it is well understood how to derive from a mortgage an amortization table for that mortgage based on principal, down payment and insurance rate, it was not obvious or well understood how to incorporate closing costs, financial condition of the mortgage lender, fees, taxes and payments into the amortization table to provide the prospective mortgage customer or mortgage borrower with an accurate picture of the real cost to them of different mortgages.

In this example, rather than decrements, the system may apply closing cost data, taxes, and fees based on the particularities of real estate law in the jurisdiction in which the mortgage borrowing tends to purchase real estate to the output of the illustration engine (which in the case of mortgages may be an amortization table or a series of cash flows derived from an amortization table). However because the system is able to process the output of the illustration engines and apply these adjustment factors to that output to yield a series of cash flows for each of the products based on the particular circumstances of a customer's profile, financial products from different lenders having different terms, fees, expenses and structural costs can be compared against one another and against other products on the market in a manner that is both objective, highly precise, mathematically and financially accurate as well as tailored to the customer's particular scenario.

Once the series of cash flows is obtained at step 206, the policies can be scored. In the exemplary embodiment being discussed, statistical, mathematical, and financial operations may be performed on the series of cash flows, or qualitative indicators may be derived from the policies to obtain qualitative or quantitative scoring components at step 207 that may then be combined into scores at step 208. Once scored, the products or policies are ranked based on the scores in step 104 as noted above.

In this example, the scoring components are policy value, sensitivity, and carrier rating. Each of these scoring components may themselves have one or more scoring subcomponents. For example, the policy value, which measures a policy's expected value for money using current interest and dividend rates, may be determined based on the internal rate of return that is calculated from the series of cash flows for each policy. Likewise, the sensitivity, which evaluates the impact of factors such as interest rate changes, penalties for early termination and policy design on the policy may be a derived from a combination of components that are in part based on the series of cash flows but also based on information about the particular insurance product such as efficiency, lapse sensitivity, no lapse guarantee, disclosure, interest guarantee, and maturity date. Furthermore, the carrier rating may be derived from a qualitative scoring component may be the carrier rating of the carrier as represented by an industry wide rating. For example, the carrier rating may be represented by a Moody's or a Standard & Poor's (S&P) financial strength rating.

In an aspect of the present invention, the scoring for a calculated value such as rate of return may use the value of the internal rate of return, as-is, or for an easier to read and more customer friendly report, a single digit value may be assigned to all policies based on the range in which the internal rate of return for that policy falls. Scoring subcomponents may be assigned scores in a similar fashion. For example, efficiency, which is determined by subtracting the internal rate of return from the credited rate of the policy, may be assigned a single digit score base on the range in which that value falls.

The ranges may be predetermined before the illustration engines are run, or they may be determined based on the statistical distribution of the policies. In other words, policies may receive a score of 5 for policy value if the internal rate of return is two standard deviations above the mean of all of the policies, a score of 4 for policy value if the internal rate of return is more than one standard deviations above the mean, a score of 3 for policy value if the internal rate of return is less than one standard deviation above or greater than one standard deviation below the mean, a score of 2 if the internal rate of return is less than one standard deviation below the mean, and a score of 1 if the internal rate of return is two standard deviations below the mean.

Other scoring components are qualitative. For example, the carrier rating of the carrier may represented by an industry-wide rating. For example, the carrier rating may be represented by a Moody's or a Standard & Poor's (S&P) financial strength rating. In the case of the S&P rating, the qualitative score values are AAA+ through CC. These scoring components are said to be qualitative because they are not calculated or derived quantitatively by the system of the present invention, regardless of whether they are determined quantitatively by an external source.

Once the scoring components and subcomponents are determined, they may be averaged together or combined using a weighted average. In aspects of the present invention, subcomponents are first combined into a group of scoring components for each policy, each score representing a different aspect or basis of comparison of the policy. For example, one score may be policy value, another may be sensitivity, and a third may be carrier rating. These scoring subcomponents may then be combined to obtain an overall score for the policy (the policy evaluation score). The scores may be combined using an arithmetic mean or a weighed average in which, for example, policy value is assigned a weight of 40%, sensitivity is assigned a weight of 40%, and carrier rating is assigned a weight of 20%. It is understood that the weights may be adjusted after the scenario has been run through the illustration engine and after the scoring components have been obtained, because recalculating the weighted average does not require running the illustration engines again. Similarly, those products that are selected for display in the report may also be changed without having to rerun the search and solve system.

By running the search and solve system on all of the products in the system regardless of which of them are selected for reporting, the policy compares each policy against all of the other policies in the system's universe of policies. The greater the number of products and their illustration engines that are incorporated into the system, the more accurate and useful the policy scores are. Thus, while an insurance broker may only be licensed to sell a few products, the customer will still be able to see how those products offered by the broker compare to other products on the market.

In alternative embodiments of the invention, the system for searching and solving for insurance policies for a particular customer scenario can be used instead to solve for and rank insurance products based on a broad array of policies derived from those products. For example, in another exemplary embodiment, a number of different customer scenarios are run through the system of the present invention and are scored. In this embodiment, each customer scenario generates a policy from the products available on the system. Therefore, if a number of different customer scenarios are run through the system, a number of different policies for each product will be scored. These scores can be combined using an arithmetic mean or weighted average, for example, to generate an overall score for the products. This overall product score is a combination of the scores of all of the policies generated by each of the customer scenarios run through the search and solve system for that product. This way, one product can be compared to all of the other policies and products on the system.

In a further exemplary embodiment, the overall product scores can themselves be combined using an arithmetic mean or weighted average to yield a product line score. A product line would represent, for example, all of the products of a particular type or that fall in a particular category. For example, in the example of life insurance, a product line may be whole life insurance, variable life insurance, term life insurance, or annuities. All of the product scores for term life insurance products may be combined together to obtain an overall score for term life products generally. This way, the term life product line as a whole may be compared and ranked against all of the other products and policies in the system.

Furthermore, the present invention may be extended so as to further aggregate the scores. Product line scores for each product line of a particular category may be combined to produce an overall score for the carrier, or product lines scores for all carriers.

Other ways of aggregating the policy scores are envisioned by the present invention, and it is understood that one of ordinary skill in the art may contemplate variations or modifications to the embodiments discussed herein that would also fall within the scope of the invention.

Furthermore, in an industry such as insurance that is highly regulated and which insurance brokers are only able to sell that small number of products for which they are licensed, this gives the customer the ability to see at a glance whether those few products that the particular insurance broker that they are in consultation with has offered them, the customer is able to see where those insurance policies rank with respect to other policies which are available. This way the customer is able to get an objective determination of whether a policy that is being offered to them is a good one relative to other policies on the market. Therefore, if an insurance policy that is offered to them from a particular insurance broker is weak in one particular scoring area or another customer is then able to take their business elsewhere.

Likewise, an insurance broker who notices that a particular product for which they are licensed to sell is weak or strong may alter the product offering he offers to his clients. An insurance broker may be able to use this product to select a shelf of products that they want to offer. For example, very large financial institutions evaluate a large number of products to determine shelf space. They may be able to use this system of the present invention to select those products that are most suitable their clients.

In addition, the system can be used by a customer who is already covered by an in force insurance policy to evaluate a potential replacement. The system allows the policyholder to compare the in force policy against what that customer could buy at that moment and determine whether it is worthwhile for the customer to cash out of their current policy and purchase a new one or whether their current policy is a good one.

In particular in the insurance industry, 1035 exchanges are replacements involving the tax-free transfer of cash value from one policy to another. Over the years, a great deal of controversy has existed over the high number of unnecessary replacements. Producers struggle with not wanting to appear to be churning their blocks by suggesting policy replacement for additional commission. However, in many instances, it is in the policyholder's best interest to exchange their policy but the producer is apprehensive in suggesting the change for fear of appearing to be churning. In this context the system with the present invention may be used to determine whether or not the policies that are being exchanged are worthwhile exchanges or whether they are simply exchanges in the course of churning; it provides an independent, third-party evaluation. In addition, there are trust owned life insurance policies (TOLI), bank owned life insurance policies (BOLI), and corporate owned life insurance (COLI) policies which are high value policies, which are purchased by institutions or entities that are less familiar with insurance products. For these markets, the system of the present invention may be used to determine whether or not the product under consideration, or in existence, is of good value. This is particularly valuable for the TOLI market, where the trust officer has a fiduciary responsibility to manage the institution or the trustee's money to the best of their ability. The system of the present invention provides the trust officer with a tool to determine whether or not the life insurance policies under their management continue to be of good value and it provides a report documenting the results of the evaluation It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of evaluating a plurality of insurance products, comprising:
   providing a computer system with a database of product information for the plurality of insurance products;
   receiving, by the computer system, data corresponding to a customer and a proposed customer policy;
   generating a proposed policy for each of the plurality of insurance products by running the data for the customer and the proposed customer policy through the computer system;
   identifying, by the computer system, a set of values for at least one of premium, death benefit, and cash value for each year for the proposed policy;
   calculating, by the computer system, a series of cash flows for the proposed policy by applying a decrement factor to the set of values, including at least one of a first decrement factor representing a probability of a customer's death, a second decrement factor representing a probably of a customer's lapse, and a third decrement factor representing a probability of a customer's persistence;
   calculating, by the computer system, an internal rate of return for the proposed policy from the series of cash flows, and a statistical distribution of a plurality of internal rate of returns of a proposed policy for the plurality of insurance products;
   determining a value for a quantitative scoring component for the proposed policy based on a comparison of the internal rate of return for the proposed policy to the statistical distribution of the plurality of internal rate of returns of the plurality of proposed policies; and
   scoring the proposed policy by combining a plurality of values for each of a plurality of scoring components, the plurality of scoring components including the quantitative scoring component, to obtain an overall score for the proposed policy.

2. The method of claim 1, further comprising, for each insurance product, combining a plurality of overall proposed policy scores generated from a plurality of different proposed policies to generate an overall insurance product score.

3. The method of claim 2, further comprising, for a line of insurance products, combining a plurality of overall product scores for each product in the line of insurance products to generate an overall product line score.

4. The method of claim 1, further comprising:
   receiving, by the computer system, a selected product from the plurality of insurance products, wherein at least one of the plurality of insurance products are not selected;
   receiving, by the computer system, input data corresponding to a different proposed customer policy;
   generating a selected proposed policy for the selected product by running the input data corresponding to the different proposed customer policy;
   evaluating, by the computer system, the selected product and an unselected product using the database of product information; and
   scoring the selected proposed policy by combining a scoring component values to obtain an overall policy score for each selected proposed policy.

5. The method of claim 1, wherein the step of scoring the proposed policy further includes:
   applying a weighting to each of the plurality of scoring components; and
   combining a plurality of weighted scoring components according to their weights to obtain the overall score for the proposed policy.

6. The method of claim 5, further comprising:
   adjusting the weighting applied to each of the plurality of scoring components and combining the plurality of weighted scoring components according to their adjusted weights to obtain a second overall policy score to re-score each proposed policy.

7. The method of claim 1, wherein determining the value for the quantitative scoring component further includes:
   determining a plurality of ranges based on the statistical distribution; and
   determining the value for the quantitative scoring component for each proposed policy based on which range in the plurality of ranges includes the internal rate of return for the proposed policy.

* * * * *